United States Patent
Ray et al.

(10) Patent No.: US 8,224,307 B2
(45) Date of Patent: Jul. 17, 2012

(54) SYSTEM AND METHOD FOR TRANSFERRING TELEPHONE CALLS BETWEEN MOBILE AND CORDLESS MODES

(75) Inventors: Amar N. Ray, Shawnee, KS (US); Cadathur V. Chakravarthy, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 315 days.

(21) Appl. No.: 11/544,225

(22) Filed: Oct. 6, 2006

(65) Prior Publication Data

US 2008/0085746 A1    Apr. 10, 2008

(51) Int. Cl.
*H04M 3/42* (2006.01)

(52) U.S. Cl. ...... 455/417; 455/74; 455/74.1; 455/127.4; 455/414.1; 455/420; 455/445; 455/552.1; 455/553.1; 455/560; 455/567; 370/352; 379/211.01; 379/211.02; 379/211.03; 379/212.01

(58) Field of Classification Search .................. 455/417, 455/445, 74, 74.1, 127.4, 414.1, 420, 552.1, 455/553.1, 560, 567; 379/211.01, 211.02, 379/211.03, 212.01; 370/352

See application file for complete search history.

(56) References Cited

U.S. PATENT DOCUMENTS

| | | | |
|---|---|---|---|
| 6,044,267 A * | 3/2000 | Foladare et al. | 455/426.1 |
| 6,192,231 B1 * | 2/2001 | Chapman et al. | 455/401 |
| 6,253,088 B1 * | 6/2001 | Wenk et al. | 455/462 |
| 6,999,769 B1 * | 2/2006 | Henon | 455/445 |
| 7,120,241 B1 * | 10/2006 | Fuoss et al. | 379/212.01 |
| 2002/0160780 A1 * | 10/2002 | Mukerjee et al. | 455/445 |
| 2004/0032938 A1 * | 2/2004 | Asami et al. | 379/142.12 |
| 2004/0127170 A1 * | 7/2004 | Riedl et al. | 455/86 |
| 2004/0248595 A1 * | 12/2004 | Hicks et al. | 455/465 |
| 2005/0059402 A1 * | 3/2005 | Jagadeesan et al. | 455/445 |
| 2005/0221845 A1 * | 10/2005 | Benco et al. | 455/462 |
| 2006/0067501 A1 * | 3/2006 | Piatt | 379/210.02 |
| 2006/0286984 A1 * | 12/2006 | Bonner | 455/445 |

* cited by examiner

*Primary Examiner* — Rafael Pérez-Gutiérrez
*Assistant Examiner* — Liton Miah
(74) *Attorney, Agent, or Firm* — PattonBoggs, LLP (57) ABSTRACT

A multimode handset and method that includes a first communications path adapted to communicate using a mobile telephone communications protocol, a second communications path adapted to communicate using a local, cordless communications protocol, and a processing unit in communication with the first and second communications paths and configured to switch between the first and second communications path during a telephone call.

7 Claims, 5 Drawing Sheets

SYSTEM AND METHOD FOR TRANSFERRING TELEPHONE CALLS BETWEEN MOBILE AND CORDLESS MODES

BACKGROUND

The telecommunications industry has evolved greatly over the past 30 years. Telecommunications developed from service providers delivering analog telephone services to homes and businesses. The analog telephone services initially limited telephones to be connected directly to telephone wires. These telephones had a base unit and a handset connected to the base unit via a cord. Cordless telephones were later developed to allow users to talk on the telephone while moving freely about his or her house or in the local vicinity. The cordless telephone is basically a combination of a telephone and a radio transmitter/receiver and has two components, a base and a handset. The base is attached to the public switched telephone network via a wire connection. The base receives an incoming call from the public switched telephone network and converts it to an FM signal, which is locally broadcast. The handset also includes a receiver/transmitter to receive the FM radio signals from the base, convert the radio signals to sound for the user of the handset to hear the other person's speech and broadcast speech spoken into the handset by the user back to the base for communication back to the other person via the public switch telephone network.

Initially, around 1980, the FM signals were broadcast at a frequency of 27 megahertz (MHz). In 1986, the frequency range was increased by the Federal Communications Commission (FCC) to be between 47 and 49 MHz. These early cordless wireless telephones had problems, such as limited range, poor sound quality, and poor security. In 1990, the FCC granted a frequency range of 900 MHz, which increased the range and clarity of the signals due to having more channels within the range. In 1994, digital cordless phones were introduced, which improved the sound quality and increased security. In 1995, Digital Spread Spectrum (DSS) was introduced for cordless telephones. DSS greatly improved security to prevent eavesdropping of telephone calls. In 1998, the frequency range of cordless telephones was increased by the FCC to 2.4 and 5.8 gigahertz (GHz). As understood in the art, these different communication techniques (i.e., analog and digital) are known as local, cordless telephone communications protocols.

There are currently 110 million households in the United States. At present, 48 million households have broadband communications delivered by service providers. Broadband communications enable high speed Internet access, but also enable digital cordless telephone capabilities, including voice over IP (VoIP).

While cordless telephones made great strides over the years, mobile telephones or cell phones were also developing during that time period. Initially, analog cell phone communications were developed. One standard was known as advanced mobile phone service (AMPS). Over time, digital mobile communications were developed. These digital communications included a number of different mobile communications protocols, including Time Division Multiple Access (TDMA), Code Division Multiple Access (CDMA), and Global System for Mobile Communications (GSM). For the most part, TDMA and CDMA have been adopted in the United States while GSM is more heavily utilized in Europe. Because of the different standards, handset makers adopted mobile handsets or telephones for the particular mobile communications protocols. To accommodate service providers and customers, handset makers eventually adopted handsets to be able to communicate over multiple mobile protocols. For example, mobile telephones are now widely available to communicate over the AMPS, CDMA, and GSM mobile communications protocols. These tri-mode telephones enable subscribers to roam in various areas of the United States and Europe and communicate over different telecommunications networks using the different wireless communications protocols.

More recently, wideband fidelity (WiFi) communications have been developed to enable computers to communicate over the Internet via WiFi access points. These WiFi access points were originally deployed in public venues, such as coffee shops, airports, and other locations to enable customers of those locations to communicate over the Internet with their computers. One reason for public deployment is the cost of the WiFi access points. More recently, WiFi access points have come down in price and are now being deployed in houses to enable computer users to access the Internet wirelessly from their computers, thereby eliminating the need to have a computer connected to a cable within a house. Although less expensive, the WiFi access points are still relatively expensive so that, relatively speaking, few homes have WiFi access points.

With this new form of wireless communication, handset makers have begun developing telephones that are capable of communicating over WiFi access points. Some of the handsets are limited to WiFi communications, but other handsets have begun integrating mobile telephone communications (e.g., CDMA and WiFi communications). There are a number of problems with WiFi. First, the handsets are expensive. Another problem that exists with WiFi telephone communications is that the WiFi voice quality is well below that of other forms of wireless communications. Studies have shown that PSTN communications and, more recently, VoIP communications receive about a 4.5 or 4.6 mean opinion score (MOS) out of a maximum 5.0 score, mobile telephone CDMA communications receive about a 3.5 or lower MOS, and WiFi communications receive about a 3.0-3.5 MOS. These phones that have been developed seek to benefit subscribers or users of these WiFi compatible handsets by public availability (e.g., coffee shops) and that the technology currently exists. While a cost savings may occur from the mobile communications service provider due to being able to switch to a WiFi communications network WiFi communications still cost money to access, although a lower monthly-fixed fee than mobile communications. Another problem that exists with WiFi is security, as WiFi is generally an open protocol that enables others with scanners to be able to listen to telephone calls made over unprotected WiFi connections. If a user desires to use WiFi at home, a costly set top box and WiFi access point is needed.

SUMMARY

To overcome the problems of existing wireless communications, the principles of the present invention provide for a multimode handset that is adapted to communicate over mobile telephone communications protocols and cordless telephones communications protocols, including analog and Internet Protocol (IP). Because cordless telephone voice quality is significantly better than many other communications protocols, users of these multimode handsets receive improved voice quality when using the multimode handsets while operating within a home proximity zone. In addition, the principles of the present invention provide for automatic switching between the different communication protocols when the multimode handset enters and exits the home proximity zone.

One embodiment of the present invention includes a multimode handset that includes a first communications path adapted to communicate using a mobile telephone communications protocol, a second communications path adapted to communicate using a local, cordless communications protocol, and a processing unit in communication with the first and second communications paths and configured to switch between the first and second communications path during a telephone call. In one embodiment, the mobile telephone communications protocol is a CDMA protocol. The local, cordless communications protocol may be analog and/or IP protocol. Switching between the first and second communication path during the telephone call may be performed automatically. In performing the switch, the processing unit may measure signal strength of a signal being communicated used in the local, cordless communications protocol and, in response to determining that the signal is above a signal strength threshold, may communicate a call transfer signal to an application server to switch the telephone call communications from the first communications path to the second communications path. If the multimode handset exits the home proximity zone, the processor may determine that the cordless communications protocol signal drops below a threshold and communicates a call transfer signal to the application server to switch the telephone call communications from the second to the first communications path.

Another embodiment in accordance with the principles of the present invention may provide an application server that includes a processing unit in communication with at least one network and software executed by the processing unit. The software may be configured to (i) receive a call transfer signal from a multimode handset to transfer an ongoing telephone call between a first communications path using a mobile telephone communications protocol and a second communications path using a local, cordless communications protocol, (ii) call the multimode handset via the first or second communications path over which the ongoing telephone call does not currently exist, and (iii) connect the multimode handset with the ongoing telephone call via the first or second communications path over which the multimode handset was called. The software may further be configured to disconnect the multimode handset from the first or second communications path from which the multimode handset was switched. The software may also be configured to manage billing for a user of the multimode handset for usage of both the first and second communications paths. The local, cordless communication protocol may be an IP protocol.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1A:
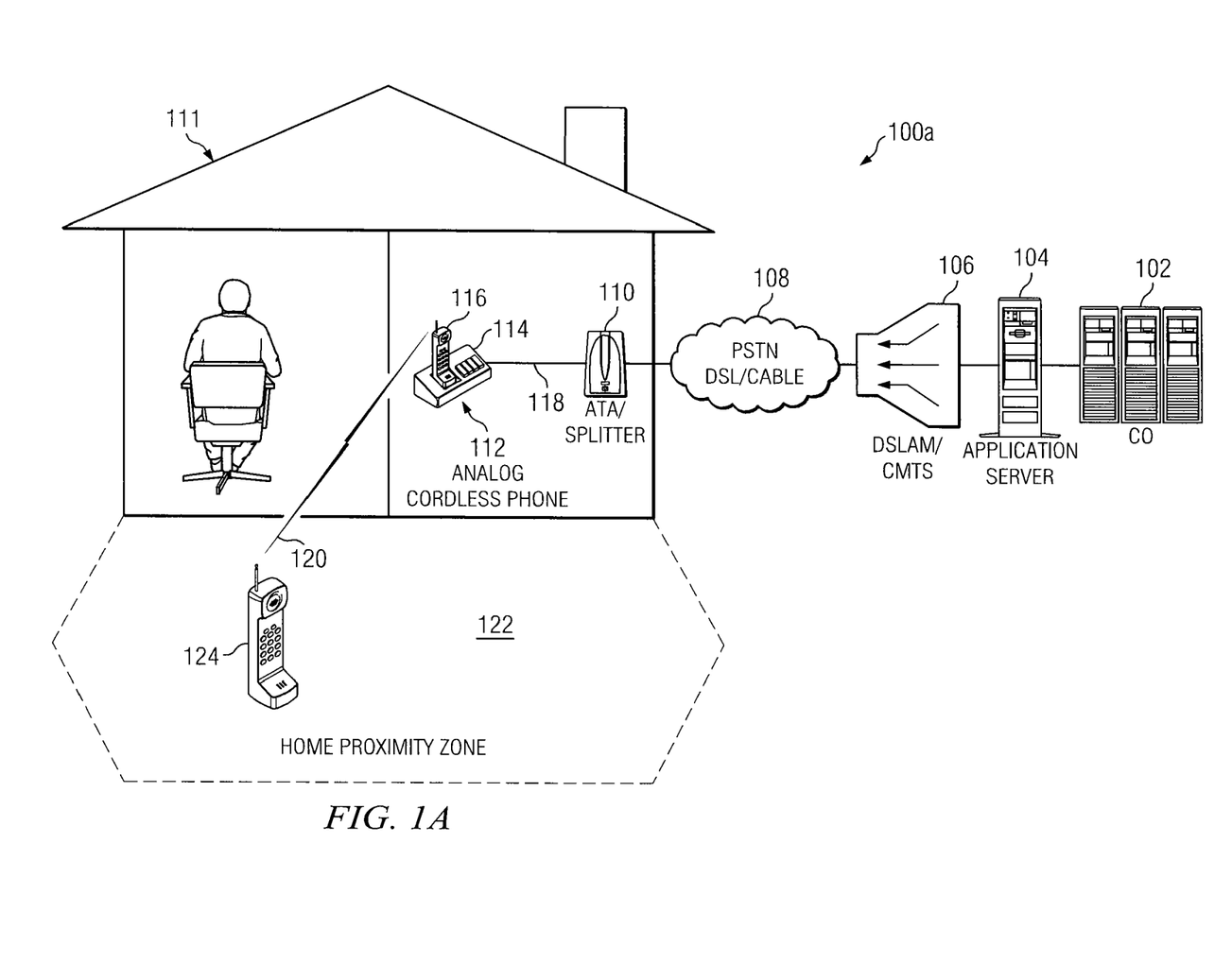
FIG. 1A is an illustration of an exemplary network for analog cordless telephone and multimode handset services via a broadband communications network within a home.

FIG. 1A is an illustration of an exemplary network 100a for analog cordless telephone services within a home. The network 100a may include a central office 102 of a service provider in communication with an application server 104. The application server may be in communication with a digital subscriber line access multiplexer (DSLAM) and/or cable modem termination system (CMTS) 106. The DSLAM/CMTS 106 operates to link many customers with DSL connections to a single high-speed asynchronous transfer mode (ATM) line. The DSLAM operates to detect voice and data signals and direct the voice signals over the public switched telephone network (PSTN) and data signals to the Internet. The CMTS 106 enables cable television operators to offer high-speed Internet access to home computers and sends and receives digital cable modem signals over a cable network. The CMTS 106 further receives signals sent upstream from a user's cable modem and converts the signals into IP packets for routing to the Internet. As understood in the art, a DSLAM and CMTS provide many of the same functions and may be used by the same or different service providers in providing analog cordless telephone services and also IP cordless telephone services (FIG. 1B).

Continuing with FIG. 1, a communications network 108 may include the public switched telephone network for providing digital subscriber lines and/or a cable network. An analog terminal adapter (ATA) and/or splitter 110 may be located in a subscriber's home 111 and in communication with the network 108 to receive communications signals (not shown) from the DSLAM/CMTS 106. An analog cordless telephone 112 that includes a base unit 114 and handset 116 may be in communication with the ATA/splitter 110. The analog cordless telephone may receive communications signals 118 from the ATA/splitter 110. As understood in the art, the base unit 114 may communicate the analog communication signals 118 to the handset 116 via an FM broadcast signal 120 anywhere within a home proximity zone 122.

A multimode handset 124 may be configured with two or more communications channels to communicate using a mobile telephone communications protocol and analog cordless telephone protocol. The multimode handset 124 may, too, communicate with the base unit 114 via the FM broadcast signal 120. A more detailed description of a multimode handset is provided with regard to FIG. 2. Although described as a multimode handset, it should be understand that the handset may be a mobile telephone having the capability to communicate with a cordless telephone base unit, as further described herein.

Figure 1B:
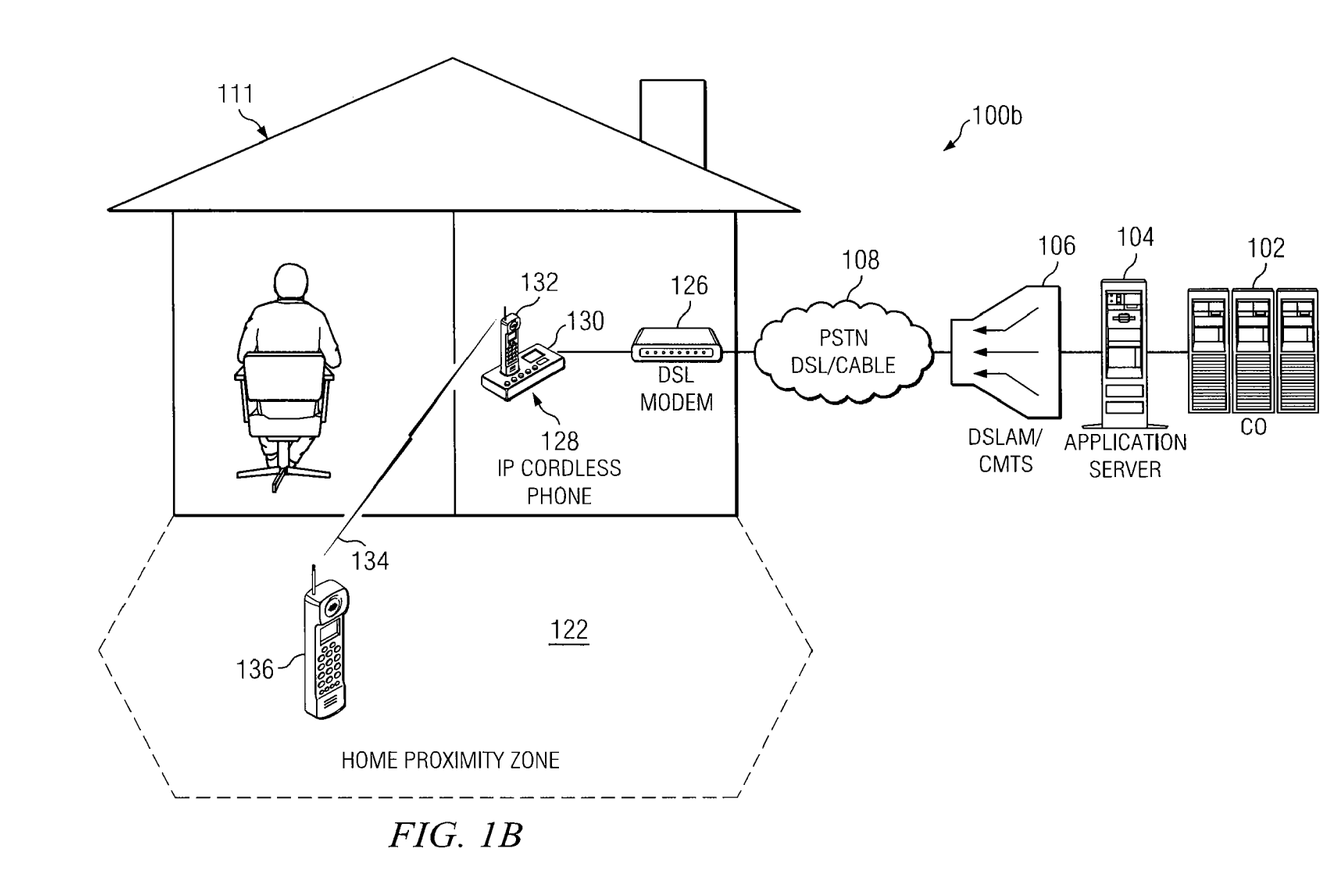
FIG. 1B is an illustration of an exemplary network for Internet protocol cordless telephone and multimode handset services via a broadband telephone network within a home.

FIG. 1B is an illustration of an exemplary network 100b for Internet protocol (IP) cordless telephone services within a home. The network 100b includes the central office 102 in communication with the application server 104. The DSLAM/CMTS 106 may be in communication with the application server and further configured to communicate over the PSTN/cable network 108. In one embodiment, a DSL protocol is communicated from the DSLAM 106 via the PSTN. A DSL modem 126 may be in communication with the network 108. An IP cordless telephone 128 may include a base unit 130 that communicates with the DSL modem 126 and IP cordless handset 132. The IP cordless handset 132 may be a multimode handset that communicates using one or more mobile telephone communication protocols (e.g., CDMA, TDMA, GSM) and a cordless telephone communications protocol (e.g., analog or IP). The wireless handset 133 may communicate with the base unit 130 via RF signals or any other wireless signals within the home proximity zone 122, as understood in the art. In many cases, service providers bundle DSL and telephone services, so telephone calls over a DSL line may likely be free if the subscriber has purchased a bundled service.

Multimode handset 136 may be configured to communicate using an IP cordless telephone protocol. However, when the multimode handset 136 exits the home proximity zone 122, the wireless handset 136 is no longer within range of the base unit 130 and switches to the mobile telephone communications protocol (e.g., CDMA protocol, as further described herein with regard to FIGS. 3 and 4, for example.

Figure 2:
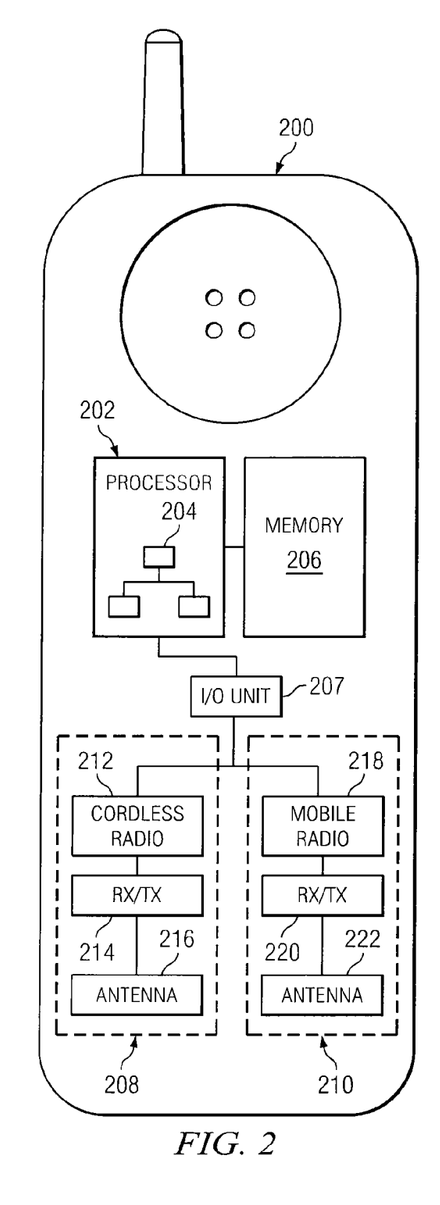
FIG. 2 is a block diagram of a multimode handset configured to communicate using a mobile and cordless telephone modes.

FIG. 2 is a block diagram of an exemplary multimode handset 200. The multimode handset 200 may include a processor 202 that executes software 204. The processor may be in communication with memory 206 and input/output (I/O) unit 207. The I/O unit may be in communication with two or more communications paths 208 and 210. For example, as shown, communication paths 208 and 210 represent a cordless communication path 208 and mobile communication path 210 for communicating over a cordless telephone network (e.g., PSTN and mobile telephone network respectively. The cordless communications path 208 may include a cordless radio 212, receiver/transmitter (RX/TX) 214, and antenna 216. The mobile communications path 210 may include a mobile radio 218, RX/TX 220, and antenna 222. It should be understood that if the cordless and mobile telephone are capable of communicating over both communications channels using the same devices along a single communications path, then the multimode handset 200 may utilize a single communications path. However, as understood in the art, the cordless and mobile communications signals are communicated using different protocols so that different communications paths are generally utilized within the multimode handset 200. It should also be understood that if one or more components of each of the communications paths may be utilized for communicating over the cordless and mobile communications channels, that the number of separate components may be reduced. It should also be understood that each communications path within the multimode handset 200 may communicate over a different communications network or path. Because cordless communications is a mature technology, the additional cost to include the cordless communication path in the multimode handset is minimal (e.g., $20 or less).

The software 204 executed on the processor 202 may be utilized to perform a number of functions for the multimode handset 200. For example, the software 204 may be utilized to perform conventional telephone functionality, such as storing names and telephone numbers in the memory 206, managing a calendar, setting alarms, and so forth. In addition, the software 204 may be utilized to determine strength of a signal received from the base unit of a cordless telephone. In one embodiment, the software 204 may have a threshold stored in the memory 206 that the software compares the signal being received from the base unit to determine whether the multimode handset 200 is within range of the base unit. If the software 204 determines that the signal received from the base unit has a signal strength above the threshold, then the software 204 may generate and communicate a call transfer signal to the base unit, which further communicates the call transfer signal to an application server. In other words, the software 204 being executed by the processor 202 may be configured to assist in managing the multimode handset 200 communicating via the cordless communications path 208 or the mobile communications path 210 using a cordless or mobile telephone communications protocol, respectively. The multimode handset may establish communications 200 with a base unit by utilizing a well established registration process. As understood in the art, the multimode handset 200 may register with the base unit of an existing cordless telephone in a similar manner as a cordless telephone with multiple handsets. In one embodiment, a customer may purchase a cordless telephone that comes with a pre-registered multimode handset or handset.

Figure 3:
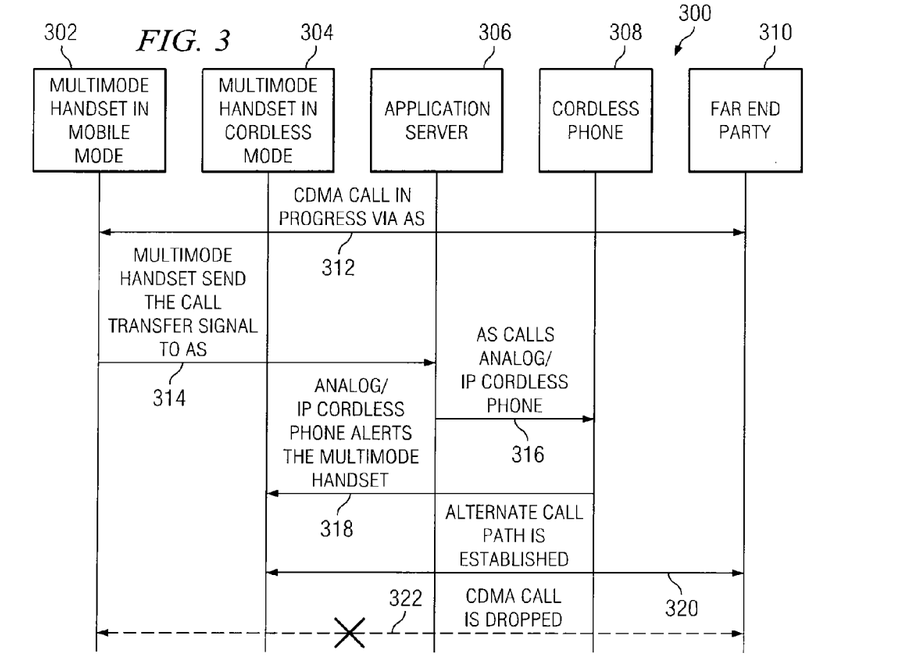
FIG. 3 is a call flow diagram illustrating exemplary call switching from a mobile telephone communications protocol and a cordless telephone communications protocol.

FIG. 3 is an exemplary call flow diagram illustrating a call switching between a mobile telephone communications protocol (e.g., CDMA) and a cordless telephone communications protocol (e.g., analog or IP). As shown, there are five different communications points between which a call flow occurs. These communication points include a multimode (MM) handset in mobile mode 302, multimode handset in cordless mode 304, application server 306, cordless phone (e.g., analog or IP) 308, and far end party 310. As shown, the multimode handset in mobile mode 302 has a current call in process via the application server 306 with the far end party 310 at step 312. In one embodiment, the mobile mode uses a CDMA protocol. While in step 312, the multimode handset may determine a signal strength from a base unit of a local, cordless base unit in either an analog or IP communications protocol to determine a signal quality with the base unit. If the multimode handset determines that the signal quality with the cordless base unit is above a signal strength threshold, then at 314, the multimode handset sends a call transfer signal to the application server 306. At step 316, the application server 306 calls the cordless phone 308 (i.e., base unit with which the multimode handset is configured to communicate). Although the call is placed to the analog/IP cordless phone 308, the phone does not ring because the multimode handset may detect the ring signal within 10 milliseconds and a maximum of 25 milliseconds to go off-hook. In other words, the multimode handset can pick-up the call before the cordless base unit is able to ring.

At step 318, the base unit of the cordless phone 308 communicates with the multimode handset in cordless mode 304. This communication enables the multimode handset in cordless mode 304 to answer the call and switch from a mobile telephone communications path (e.g., cellular network to a cordless telephone communications path so that that an alternative call path (e.g., PSTN is established at step 320 between the far end party and the multimode handset. Once the alternative call path is established, the CDMA call between the multimode handset operating in mobile mode 304 and far end party 310 is dropped by the application server. It should be understood that the multimode handset may operate in conjunction with the application server 306 to perform the switch from the mobile mode to the cordless mode. During that switchover, the application server operates to determine the on-hook and off-hook status of the cordless telephone 308. If the cordless telephone is off-hook when the multimode handset comes into range with the base unit of the cordless telephone, the application server may not place the call to the cordless telephone 308.

In the event of a telephone call being placed to the telephone number of the cordless phone 308 while the multimode handset is in cordless mode 304, the application server may handle call waiting as understood in the art. If after switching a call from mobile to cordless mode, another mobile telephone with the same number can be used. However, if a second mobile handset with the same telephone number is in use, then a call cannot be transferred to the mobile mode from the cordless mode unless the second mobile handset goes on-hook. It should be understood that the base unit of the cordless telephone functions to communicate signals with the cordless handset and multimode handset and security with both handsets may be maintained using a variety of secure communication techniques as understood in the art.

Figure 4:
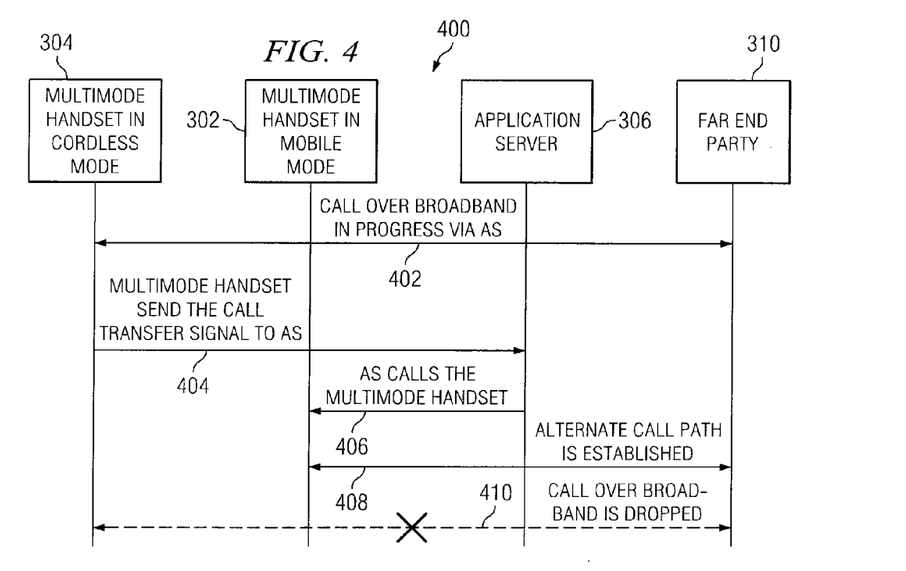
FIG. 4 is an illustration of an exemplary call flow diagram illustrating a telephone call switching from a cordless telephone communications protocol and mobile telephone communications protocol.

FIG. 4 is an illustration of an exemplary call flow diagram 400 illustrating a telephone call switching between a cordless telephone communications protocol and mobile telephone communications protocol. The process starts at step 402 where a call between the multimode handset in cordless mode 304 is in progress with the far end party 310. While the call is in progress, the user may leave the house, thereby extending beyond the range of the base unit of the cordless phone. The multimode handset may determine that the signal quality with the base unit drops below a threshold signal quality (e.g., −60 dBmi) and send a call transfer signal to the application server at step 404. At step 406, the application server calls the multimode handset in mobile mode 302 to establish a new connection via a mobile communications path. It should be understood that the cordless telephone call connection and mobile telephone call connection may be via the same or different service providers, but that the application server 306 may be configured to communicate with both service providers' systems to manage communications for the multimode handset. At step 408, an alternative call path is established for the multimode handset in mobile mode 302. It should be understood that if the multimode handset uses a different mobile telephone protocol, that the alternative mobile communications protocol may be utilized to establish the alternative call path. After the alternative call path is established at step 408, the application server may drop the call between the far end party and the multimode handset in cordless mode 304 at step 410.

Figure 5:
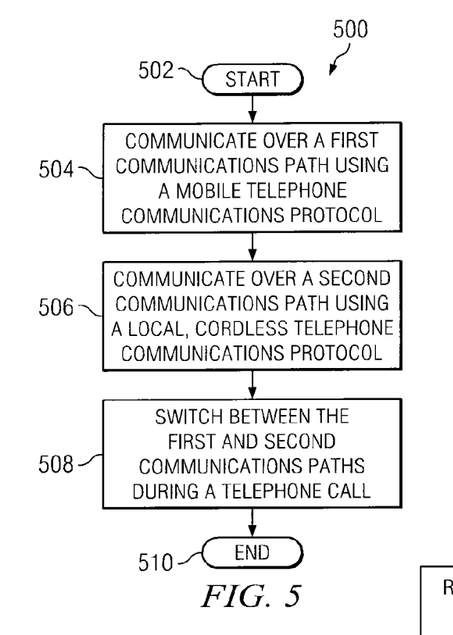
FIG. 5 is a block diagram of an exemplary process for a multimode handset switching between mobile and cordless telephone communications protocols.

FIG. 5 is a block diagram of an exemplary process 500 for a multimode handset switching between mobile and cordless telephone communications protocols. The process 500 starts at step 502. At step 504, a multimode handset may be communicating over a first communications path at the telephone using a mobile telephone communications protocol. In addition, the multimode handset may be communicating over a second communications path at the telephone using a local, cordless telephone communications protocol at step 506. In communicating over the first and second communications path, the multimode handset may be conducting a telephone call on one of the communications paths while "listening" to the other communications path to measure signal strength over the communications path that is currently not being used for the telephone call. At step 508, the multimode handset may switch between the first and second communications paths during the telephone call. In switching between the first and second communications paths, the multimode handset may use devices within the multimode handset that are configured to communicate over a different wireless path, such as a local, cordless telephone communications path that uses an analog or IP protocol, for example. The process ends at step 510.

Although not shown, as described with regard to FIGS. 3 and 4, the multimode handset may measure signal strength of a signal being communicated using the local, cordless telephone communications protocol. In response to determining that the signal is above a signal strength threshold, the multimode handset may communicate a call transfer signal (e.g., "*7") to an application server to switch the telephone call from the first to the second communications path. In response to receiving a telephone call via the communications path over which the telephone call is not being conducted, the multimode handset may switch to answer the telephone call, which is a continuation of the telephone call being conducted on the other communications. The switch may occur within 600 milliseconds (ms) to minimize the ability for a user to detect that the call switched between the first and second communications paths. The 600 ms switchover results from (i) 20 ms for detecting the cordless signal strength, (i) 50 ms for the cell switch or call forwarding signal to be sent from the multimode handset to the application server, (iii) 200 ms for the application server to set up the second call path, (iv) 130 ms for the multimode handset to receive the new call, and (v) 200 ms for the application server to disconnect the old connection and start and stop billing management. The multimode handset may provide an indicator to notify a user of a mode switch. For example, the multimode handset may display a light using a light emitting diode, display a message on a display, produce a tone or other sound, vibrate, or provide any other indicator or a combination of indicators to alert the user that the multimode handset has switched or is currently operating over one or the other communications paths. In one embodiment, the multimode handset may include a light to produce one color while communicating using a mobile communications protocol and another color using a cordless communications protocol.

Figure 6:
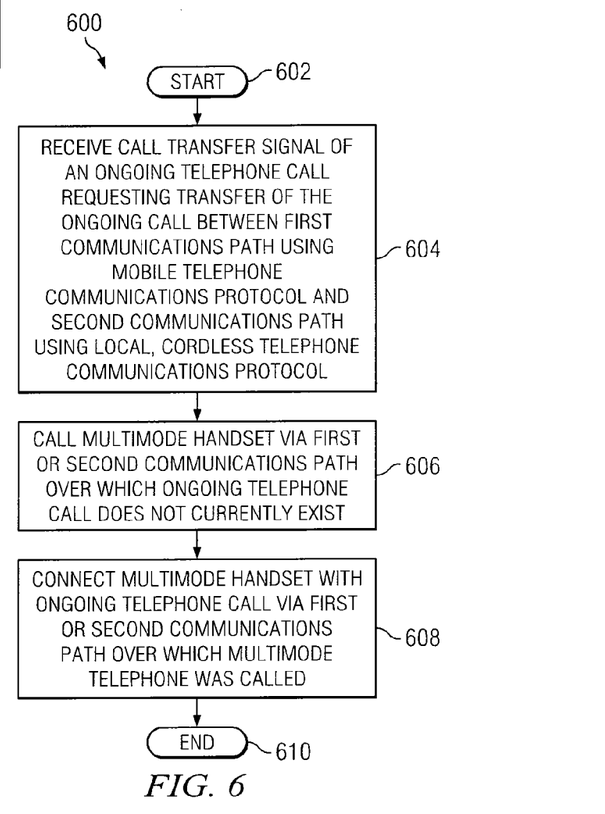
FIG. 6 is a flow diagram of an exemplary process for an applications server for switching a multimode handset between a mobile and cordless and cordless telephone communications protocol.

FIG. 6 is a flow diagram of an exemplary process 600 for an applications server for switching a multimode handset between a mobile and cordless telephone communications protocol. The process of managing a multimode handset usage starts at step 602. At step 604, a call transfer signal of an ongoing telephone call is received to request transfer of the ongoing call between a first communications path using a mobile telephone communications protocol and a second communications path using a local, cordless telephone communications protocol. At step 606, a multimode handset is called via the first or second communications path over which the ongoing telephone call does not currently exist. At step 608, the multimode handset is connected with the ongoing telephone call via the first or second communications path over which the multimode handset was called. The process ends at step 610. The process may also include disconnecting the multimode handset from the first or second communications path from which the ongoing telephone call was switched. In addition, billing may be managed for a user of the multimode handset for using both a first and second communications path.

Figure 7:
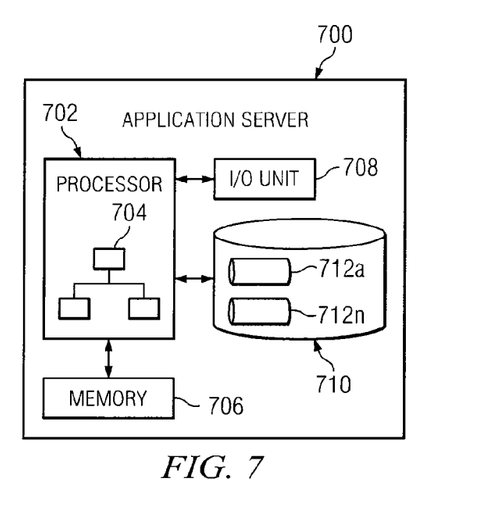
FIG. 7 is a block diagram of an exemplary application server configured to assist a multimode handset to switch between mobile and cordless telephone communications networks.

FIG. 7 is a block diagram of an exemplary application server configured to assist a multimode handset to switch between mobile and cordless telephone communications networks. The application server 700 includes a processor 702 that executes software 704. The processor 702 may be in communication with memory 706, input/output (I/O) unit 708, and storage unit 710. The storage unit may include one or more databases 712a-712n (collectively, 712) that are used to store information associated with subscribers or any other aspect of enabling users of multimode handsets to communicate over mobile telephone communications paths and local cordless telephone communications paths. The database 712 may include a list of local telephone numbers associated with each subscriber who pays for or utilizes the services of the multimode phone switching between the mobile telephone communications paths and the local, cordless telephone communications paths. By storing the local telephone numbers (e.g., home telephone numbers) and mobile telephone numbers, the application server 700 is able to call the user at his or her multimode handset via the home telephone number or mobile telephone number in response to receiving a call transfer signal during a telephone call. It should be understood that any other information associated with the user's account may be stored in the database as step 712.

TABLE I

Subscriber Phone Number Lookup Table

| Subscriber | Account Number | Mobile Telephone Number | Home Telephone Number |
|---|---|---|---|
| Robert Smith | A1234 | 555-123-4567 | 555-405-6997 |
| Paul Littleman | 7B281 | 555-643-1276 | 555-769-0298 |
| Susan Francis | 9JT31 | 555-202-3294 | 555-202-3332 |

TABLE I is an exemplary listing of telephone numbers associated with subscribers for use in providing switching of telephone communications modes as described with regard to FIGS. 3 and 4. In operation, the application server receives a call transfer signal from a multimode handset, looks up the telephone number that the multimode handset is using for the call (e.g., 555-643-1276), looks up the associated telephone number to call (e.g., 555-769-0298), and calls that telephone number to switch the call from the mobile communications path to the cordless communications path.

In addition to the application server 700 managing communications for the users when entering and exiting a home proximity zone (i.e., within the range of a base unit of a home cordless telephone), the application server 700 may additionally manage network usage monitoring and fees associated with a subscriber switching between a mobile telephone communications path and a cordless telephone communications path. For example, the application server 700 may store dates and times of day at which a users multimode handset switches from one protocol to another in the databases 712. Billing charges for providing such switching services may be managed by the software 704 of the application server 700. It should be understood that such account management may be provided by off-the-shelf software or custom design software for handling such functionality. The application server 700 may also be in communication with servers of service providers for which a user receives telecommunications services (e.g., mobile, phone services and home, local and long distance telephone services). The software 704 of the application server 700 may receive and/or communicate information to the different servers of the telecommunications service providers for managing operations of the multimode handset switching between different communications protocols. As previously described, the application server may track communications of subscribers who use the switching services between mobile communications and cordless communications so that any requests by the multimode handset may be immediately received by the application server 700 and acted on within a certain period of time (e.g., 600 milliseconds). The application server 700 may provide different and/or other functionality for providing the switching services as described herein.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. An application server, comprising:
 a processing unit in communication with at least one network; and
 software executed by said processing unit and configured to:
  receive a call transfer signal from a multimode handset to transfer an ongoing telephone call between a first communications path using a mobile telephone communications protocol and a second communications path using a local, cordless communications protocol;
  determine whether a cordless telephone with which the multimode handset is within range is off-hook; and
  if the cordless telephone is not off-hook:
   call the multimode handset via the first or second communications path over which the ongoing telephone call does not currently exist; and
   connect the multimode handset with the ongoing telephone call via the first or second communications path over which the multimode handset was called;
  otherwise, prevent a call transfer from the first to the second communications path.

2. The application server according to claim 1, wherein said software is further configured to disconnect the multimode handset from the first or second communications path from which the multimode handset was switched.

3. The application server according to claim 1, wherein said software is further configured to manage billing for a user of the multimode handset for usage of both the first and second communications paths.

4. The application server according to claim 1, wherein the local, cordless communications protocol is IP.

5. A method for managing multimode handset usage, said method comprising:
 receiving a call transfer signal of an ongoing telephone call requesting to transfer the ongoing telephone call between a first communications path using a mobile telephone communications protocol and a second communications path using a local, cordless communications protocol;
 determining whether a cordless telephone with which the multimode handset is within range is off-hook; and
 if the cordless telephone is not off-hook:
  calling the multimode handset via the first or second communications path over which the ongoing telephone call does not currently exist; and
  connecting the multimode handset with the ongoing telephone call via the first or second communications path over which the multimode handset was called;

otherwise, preventing a call transfer from the first to the second communications path.

6. The method according to claim 5, further comprising disconnecting the multimode handset from the first or second communications path from which the ongoing telephone call was switched.

7. The method according to claim 5, further comprising managing billing for a user of the multimode handset for usage of both the first and second communications paths.

* * * * *